(12) United States Patent
Hwang et al.

(10) Patent No.: US 11,505,234 B2
(45) Date of Patent: Nov. 22, 2022

(54) DEVICE FOR STOWING STEERING WHEEL AND CONTROL METHOD THEREOF

(71) Applicants: Hyundai Motor Company, Seoul (KR); Kia Motors Corporation, Seoul (KR)

(72) Inventors: Sang Woo Hwang, Seoul (KR); Jai Hak Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 386 days.

(21) Appl. No.: 16/891,787

(22) Filed: Jun. 3, 2020

(65) Prior Publication Data

US 2021/0171087 A1 Jun. 10, 2021

(30) Foreign Application Priority Data

Dec. 4, 2019 (KR) .......................... 10-2019-0159936

(51) Int. Cl.
*B62D 1/183* (2006.01)
*F16H 3/66* (2006.01)
*F16H 55/26* (2006.01)
*B62D 1/04* (2006.01)

(52) U.S. Cl.
CPC ............... *B62D 1/183* (2013.01); *B62D 1/04* (2013.01); *F16H 3/66* (2013.01); *F16H 55/26* (2013.01)

(58) Field of Classification Search
CPC .......... B62D 1/183; B62D 1/04; B62D 1/185; B62D 1/181; F16H 3/26
See application file for complete search history.

(56) References Cited

U.S. PATENT DOCUMENTS

2019/0308662 A1 10/2019 Christiansen

*Primary Examiner* — Daniel D Yabut
(74) *Attorney, Agent, or Firm* — Fox Rothschild LLP (57) ABSTRACT

A device for stowing a steering wheel and a control method thereof are provided. The device includes a steering wheel module having a steering wheel and the steering wheel module is movable to an interior of a stowage space together with the steering wheel. A complex planetary gear set having first to fifth rotational elements and first to third braking elements, which are organically coupled is provided. A sliding unit is configured to slide the steering wheel module into the stowage space, and a return spring is configured to provide resilience force in a direction in which the steering wheel module moves away from the storage space to be deployed.

13 Claims, 7 Drawing Sheets

DEVICE FOR STOWING STEERING WHEEL AND CONTROL METHOD THEREOF

CROSS-REFERENCE TO RELATED APPLICATION

This application claims priority to Korean Patent Application No. 10-2019-0159936, filed on Dec. 4, 2019, the disclosure of which is incorporated herein by reference.

BACKGROUND

1. Field of the Disclosure

The present disclosure relates to a device for stowing a steering wheel, which is capable of securing desired steering wheel stowage and deployment speeds while reducing cost and weight thereof, and a control method thereof.

2. Description of the Related Art

A steer-by-wire (SBW) system is a system in which steering is performed through connection between a steering wheel and front tires by an electrical signal without mechanical connection therebetween. The SBW system has an advantage in that tires are capable of being steered irrespective of rotation of a steering wheel and, therefore, may stow the steering wheel through movement of the steering wheel when the associated vehicle is autonomously driven in an autonomous mode. In particular, the seat space of the driver may be increased.

For a steering wheel stowing system, technologies such as a rotational stowing system and a linear stowing system have been developed. However, these technologies are adapted to move a steering wheel within a short distance and, therefore, have a limitation as to movement range thereof. As another steering wheel stowing system, a technology for moving a steering wheel through a stowing actuator has been developed. In this case, however, there may be a drawback in terms of a layout due to additional installation of the actuator. Accordingly, a space maximization effect, which is a main advantage of the SBW system, may be degraded.

Furthermore, when driving control management is shifted to the driver based on a system request during autonomous driving, steering by the driver should be enabled within a certain time (e.g., 4 seconds). However, smooth steering by the driver may be unable to be achieved since there is no system capable of rapidly deploying the stowed steering wheel. When the size of the actuator is increased to solve the above-mentioned problem, there may be problems in terms of weight and cost.

The above matters disclosed in this section are merely for enhancement of understanding of the general background of the disclosure and should not be taken as an acknowledgement or any form of suggestion that the matters form the related art already known to a person skilled in the art.

SUMMARY

Therefore, the present disclosure provides a device for stowing a steering wheel capable of securing desired steering wheel stowage and deployment speeds while reducing cost and weight thereof, and a control method thereof.

In accordance with an aspect of the present disclosure, a device for stowing a steering wheel may include a steering wheel module having a steering wheel, the steering wheel module being movable to an interior of a stowage space together with the steering wheel, a complex planetary gear set having a first rotational element connected to the steering wheel while being selectively locked by a first braking element, a second rotational element connected to a reaction force motor, a third rotational element selectively locked by a second braking element, a fourth rotational element selectively locked by a third braking element, and a fifth rotational element configured to operate as an output element, a sliding unit configured to slide the steering wheel module into the stowage space using rotational force output from the fifth rotational element, and a return spring configured to provide resilience force in a direction in which the steering wheel module moves away from the storage space to be deployed.

The complex planetary gear set may include a first planetary gear set and a second planetary gear set. The first rotational element may be a first sun gear of the first planetary gear set. The second rotational element may be a first carrier of the first planetary gear set. The third rotational element may include a first ring gear of the first planetary gear set and a second sun gear of the second planetary gear set. The fourth rotational element may be a second carrier of the second planetary gear set. The fifth rotational element may be a second ring gear of the second planetary gear set.

The sliding unit may include a rack gear disposed at an inner surface of the stowage space, which is formed in an interior of a vehicle and thus, the rack gear may extend in an axial direction of the steering wheel. The fifth rotational element may be rotatably provided at the steering wheel module to connect the fifth rotational element between the third rotational element and the rack gear in a gear engagement manner, to be movable along the rack gear while rotating.

An idle gear may be engaged with the first ring gear. A worm gear may be provided to be coaxial with the idle gear. The worm gear may be engaged with the second sun gear. The second sun gear may be engaged with the second ring gear via the second carrier. The second ring gear may be engaged with the rack gear such that the first ring gear and the rack gear are engaged in a gear engagement manner. The return spring may be connected, at a first end thereof, to an end of the steering wheel module while being connected, at a second end thereof, to a portion of a vehicle body facing the steering wheel module.

Additionally, the device may include a controller configured to operate the reaction force motor in a state of locking the first braking element and releasing locking of the second braking element while locking the third braking element, when a stowage mode for the steering wheel is requested, thereby causing the steering wheel module to slide by actuation force of the reaction force motor. The device may further include a controller configured to release locking of the third braking element when a deployment mode for the steering wheel is requested, thereby causing the second carrier to be freely rotatable such that the steering wheel module slides in a deployment direction by resilience force of the return spring.

In the deployment mode for the steering wheel, the controller may be configured to operate the reaction force motor in a state of releasing locking of the first braking element while locking the second braking element and the third braking element, to synchronize a steering angle of the steering wheel with a tire steering angle. In a driver steering mode, the controller may be configured to operate the reaction force motor in a state of releasing locking of the first braking element while locking the second braking element and the third braking element, to apply reaction force to the steering wheel.

In accordance with another aspect of the present disclosure, a method for controlling the steering wheel stowing device may include operating, by the controller, the reaction force motor in a state of locking the first braking element and releasing locking of the second braking element while locking the third braking element, when the stowage mode for the steering wheel is requested, thereby causing the steering wheel module to slide by actuation force of the reaction force motor.

When the deployment mode for the steering wheel is requested, locking of the third braking element may be released, thereby causing the rotational elements of the second planetary gear set to be freely rotatable to allow the steering wheel module to slide in the deployment direction by resilience force of the return spring. In the deployment mode for the steering wheel, the reaction force motor may be operated in a state in which locking of the first braking element is released, and the second braking element and the third braking element are locked, to synchronize a steering angle of the steering wheel with a tire steering angle. In a driver steering mode, the reaction force motor may be operated in a state of releasing locking of the first braking element while locking the second braking element and the third braking element, to apply reaction force to the steering wheel.

Through the above-described configurations, the present disclosure provides the following effects. In other words, stowage operation of the steering wheel may be performed more rapidly by the reaction force motor which operates at a high torque. In particular, when an emergency deployment operation of the steering wheel is required, the reaction force motor may be configured to deploy the steering wheel together with the steering wheel module at high speed by resilience force of the return spring. Accordingly, operation of shifting driving control management to the driver during autonomous driving may be performed more rapidly and safely.

In addition, since stowage operation of the steering wheel may be performed by the reaction force motor previously mounted to the steering system, it is unnecessary to additionally install a motor or actuator for stowage operation of the steering wheel. Accordingly, in particular, it may be possible to reduce cost and weight while maintaining a space maximization effect realized by the SBW system.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. Wherever possible, the same reference numbers will be used throughout the drawings to refer to the same or like parts.

The present disclosure is applicable to a vehicle having a steer-by-wire (SBW) system. The SBW system may be configured to stow a steering wheel 12 using a reaction force motor 30 previously mounted to a steering system when stowage operation of the steering wheel 12 is requested. The SBW system may also be configured to deploy the steering wheel 12 using resilience force of a return spring 40 when deployment operation of the steering wheel 12 is requested.

Figure 1:
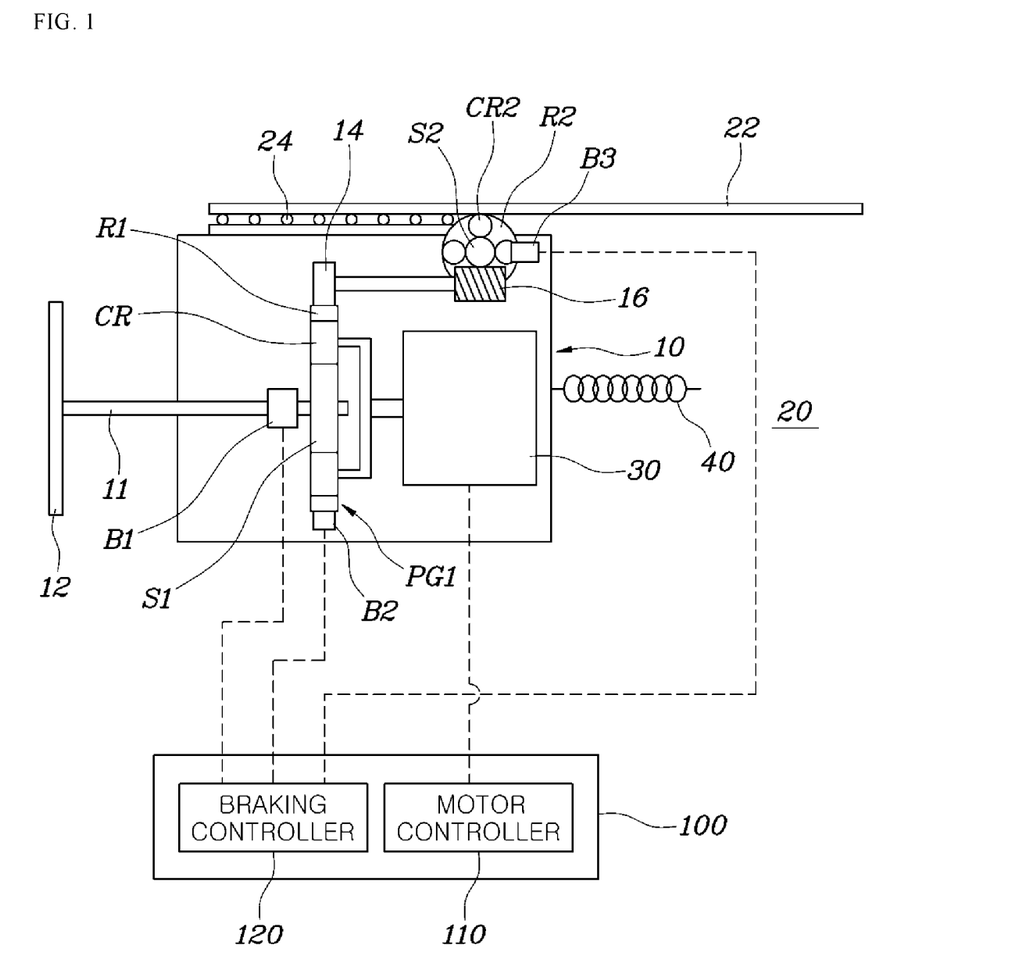
FIG. 1 is a view schematically showing the entire structure of a device for stowing a steering wheel in accordance with an exemplary embodiment of the present disclosure.

FIG. 1 is a view schematically showing the entire structure of a device for stowing the steering wheel 12 in accordance with the present disclosure. The steering wheel stowing device may include a steering wheel module 10, a complex planetary gear set, a sliding unit, and the return spring 40. Referring to FIG. 1, the steering wheel module 10 may include the steering wheel 12 and may be movable to an interior of a stowage space 20 together with the steering wheel 12. In particular, the stowage space 20 may be formed within an interior of a vehicle allowing the stowage space 20 to extend in an axial direction of the steering wheel 12.

The complex planetary gear set may include five rotational elements, that is, first, second, third, fourth and fifth rotational elements tooth-engaged with one another to rotate together. The first rotational element may be connected to the steering wheel 12 (e.g., continuously connected), and may be locked by a first braking element B1. The second rotational element may be connected to the reaction force motor 30 (e.g., continuously connected). The third rotational element may be locked by a second braking element B2. The fourth rotational element may be locked by a third braking element B3. The fifth rotational element may operate as an output element.

For example, each of the first braking element B1, the second braking element B2 and the third braking element B3 may be a stopper configured to be operated by a solenoid. The first braking element B1 may be configured to limit rotation of a steering column 11, thereby braking the first rotational element. The second braking element B2 may be configured to be engageable with a tooth of the third rotational element, thereby braking the third rotational element. In addition, the third braking element B3 may be configured to be engageable with a tooth of the fourth rotational element, thereby braking the fourth rotational element.

Meanwhile, the sliding unit may be configured to slide the steering wheel module 10 into the stowage space 20 using rotational force output from the fifth rotational element. In addition, the return spring 40 may provide resilience force in a direction in which the steering wheel module 10 moves away from the stowage space 20 to be deployed.

In other words, stowage and operation of the steering wheel 12 may be performed rapidly by the reaction force motor 30 which operates at a high torque. In particular, when an emergency deployment operation of the steering wheel 12 is required, the steering wheel 12 may be deployed together with the steering wheel module 10 at high speed by the resilience force of the return spring 40. Accordingly, operation of shifting driving control management to the driver during autonomous driving may be performed more rapidly and safely.

In addition, since stowage operation of the steering wheel 12 is performed by the reaction force motor 30 previously mounted to the steering system, it is unnecessary to additionally install a motor or actuator for stowage operation of the steering wheel 12. Accordingly, it may be possible to reduce cost and weight while maintaining a space maximization effect realized by the SBW system.

Meanwhile, the complex planetary gear set may include a first planetary gear set PG1 and a second planetary gear set PG2. In particular, each of the first planetary gear set PG1 and the second planetary gear set PG2 may be a single-pinion planetary gear set including a sun gear, a carrier and a ring gear. The first planetary gear set PG1 and the second planetary gear set PG2 may be connected in a gear engagement manner.

Detailed configurations will be described with reference to the accompanying drawings. The first rotational element may be a first sun gear S1 of the first planetary gear set PG1, and the second rotational element may be a first carrier CRI of the first planetary gear set PG1. The third rotational element may include a first ring gear R1 of the first planetary gear set PG1 and a second sun gear S2 of the second planetary gear set PG2. The fourth rotational element may be a second carrier CR2 of the second planetary gear set PG2. The fifth rotational element may be a second ring gear R2 of the second planetary gear set PG2.

In other words, the first sun gear S1 may be directly connected to the steering column 11 while being connected to the steering wheel 12 (e.g., continuously connected). The first carrier CR1 may be connected to the reaction force motor 30 (e.g., continuously connected). The first ring gear R1 may be connected to the second sun gear S2 in a gear engagement manner (e.g., continuously connected). In addition, the second carrier CR2 may be connected between the second sun gear S2 and the second ring gear R2 in a gear engagement manner. The second ring gear R2 may be connected to a rack gear 22 which will be described later (e.g. continuously connected). Accordingly, actuation force for stowage operation of the steering wheel module 10 may be provided.

The individual elements of the complex planetary gear set are not limited to the above-described connection structures, and may be configured using other connections structures capable of stowing the steering wheel module 10 in accordance with the operation of the reaction force motor 30. Meanwhile, the sliding unit may be configured to slide the steering wheel module 10 in the axial direction of the steering wheel 12. Referring to FIG. 1, the rack gear 22 may be installed at an inner surface of the stowage space 20 formed in the interior of the vehicle and the rack gear 22 may extend in the axial direction of the steering wheel 12.

In addition, the fifth rotational element may be rotatably provided at the steering wheel module 10. The fifth rotational element may be connected between the third rotational element and the rack gear 22 in a gear engagement manner and may be movable along the rack gear 22 while rotating. In particular, the gear engagement structure according to the above-described gear engagement manner may be a gear engagement structure including a worm gear 16 and a rack-and-pinion gear set. For example, an idle gear 14 may be engaged with outer teeth of the ring gear R which is the third rotational element.

Further, the worm gear 16 may be installed to be coaxial with the idle gear 14. The worm gear 16 may be engaged with the second sun gear S2. The second sun gear S2 may be engaged with the second ring gear R2 via the second carrier CR2. The second ring gear R2 may be engaged with the rack gear 22. Accordingly, the first ring gear R1 and the rack gear 22 may be connected in a gear engagement manner. In particular, the second sun gear S2 may operate as a worm wheel gear and may be configured to rotate by receiving rotational force from the worm gear 16. In other words, the first ring gear R1 may be engaged with the idle gear 14, the worm gear 16 rotating together with the idle gear 14 may be engaged with the second sun gear S2 of the second planetary gear set PG2, and the second ring gear R2 of the second planetary gear set PG2 may be engaged with the rack gear 22.

In accordance with such a gear engagement structure, when rotational force of the reaction force motor 30 is transmitted from the first ring gear R1 to the second sun gear S2 in accordance with a request for stowage operation of the steering wheel module 10, the second ring gear R2 may be rotated while engaged with the rack gear 22 since the second carrier CR2 operates as a locking element by the third braking element B3. Accordingly, the steering wheel module 10 may be moved along the rack gear 22, thereby causing the steering wheel 12 to be stowed.

For reference, in accordance with the present disclosure, the complex planetary gear set and also the reaction force motor 30, may be included in the steering wheel module 10. Accordingly, the complex planetary gear set and the reaction force motor 30 may be configured to move together during movement of the steering wheel module 10. In addition, a guide structure using rollers 24 may be disposed between an outer surface of the steering wheel module 10 and the inner surface of the stowage space 20 facing the outer surface of the steering wheel module 10. By the guide structure, the steering wheel module 10 may be smoothly slidable.

Meanwhile, in accordance with the present disclosure, the return spring 40 may be connected, at a first end thereof, to an end of the steering wheel module 10 while being connected, at a second end thereof, to a portion of a vehicle body facing the steering wheel module 10. For example, the return spring 40 may be a coil spring. In particular, the return spring 40 may be gradually compressed as the steering wheel module 10 moves in a stowage direction, and may be configured to move the steering wheel module 10 in a deployment direction by resilience force thereof when compression thereof is released.

Figure 6:
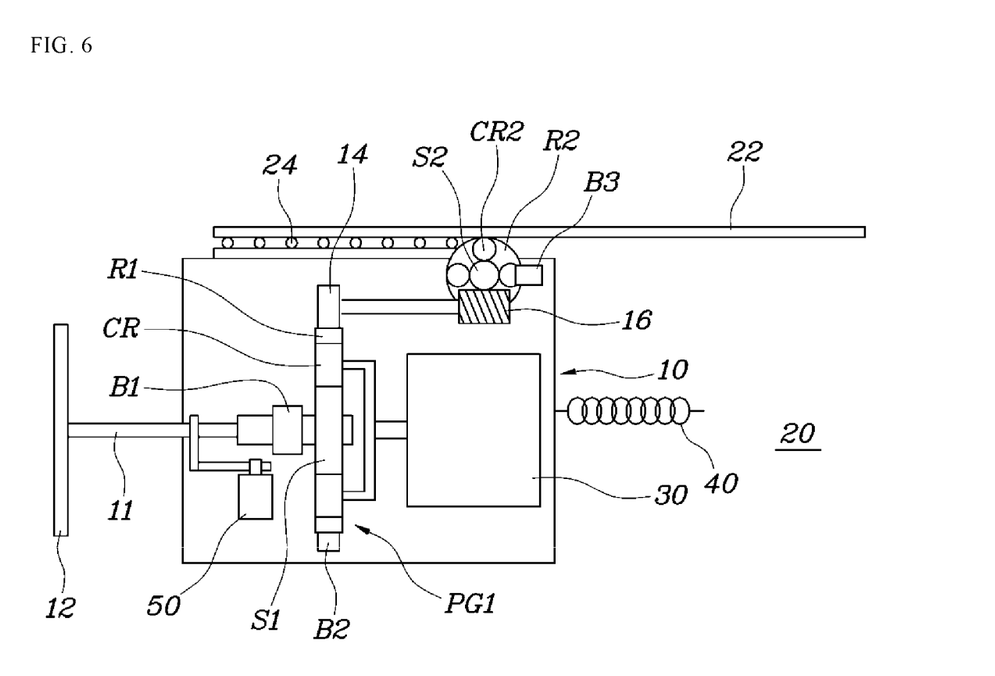
FIG. 6 is a view showing an embodiment in which a telescopic motor is mounted to the steering wheel stowage device according to an exemplary embodiment of the present disclosure.

In addition, referring to FIG. 6, the device of the present disclosure may further include a telescopic motor 50 configured to axially move the steering wheel 12. For example, the telescopic motor 50 may be installed at the steering column 11. In accordance with operation of the telescopic motor 50, it may be possible to stow or deploy the steering wheel 12 in a direction of stowing or deploying the steering wheel module 10.

In other words, operation of stowing the steering wheel 12 may be possible in accordance with operation of the telescopic motor 50, in addition to operation of stowing the steering wheel module 10 in accordance with operation of the reaction force motor 30. Operation of deploying the stowed steering wheel 12 may also be possible through operation of the telescopic motor 50 and operation of the return spring 40. Thus, the steering wheel 12 may be stowed or deployed in a 2-step manner.

Figure 2:
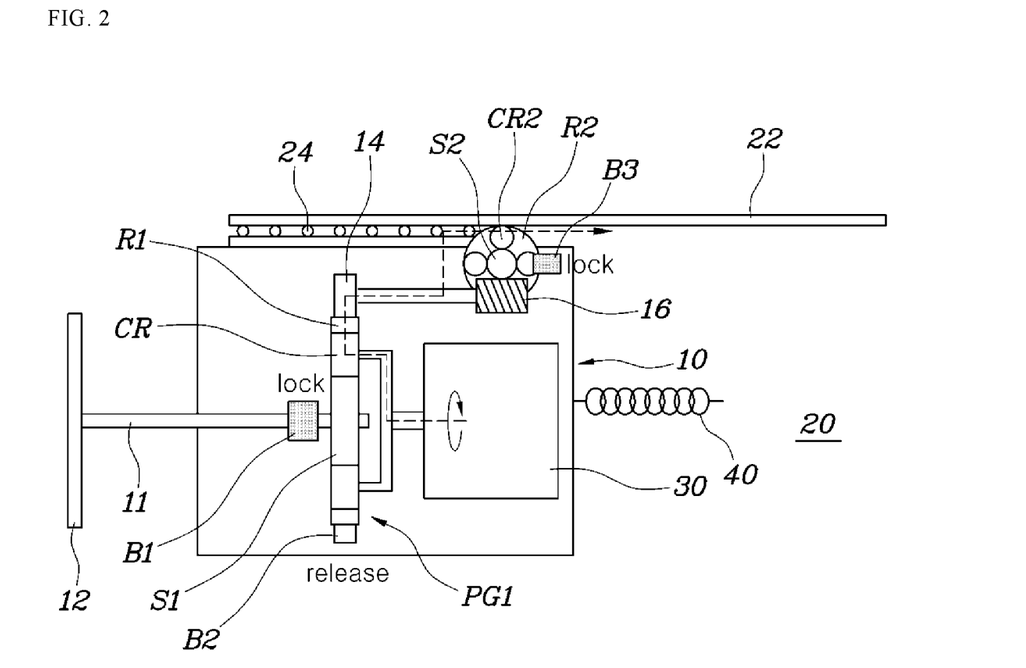
FIG. 2 is a view showing an actuation force path for operation of stowing a steering wheel module together with the steering wheel in accordance with an exemplary embodiment of the present disclosure.
Figure 3:
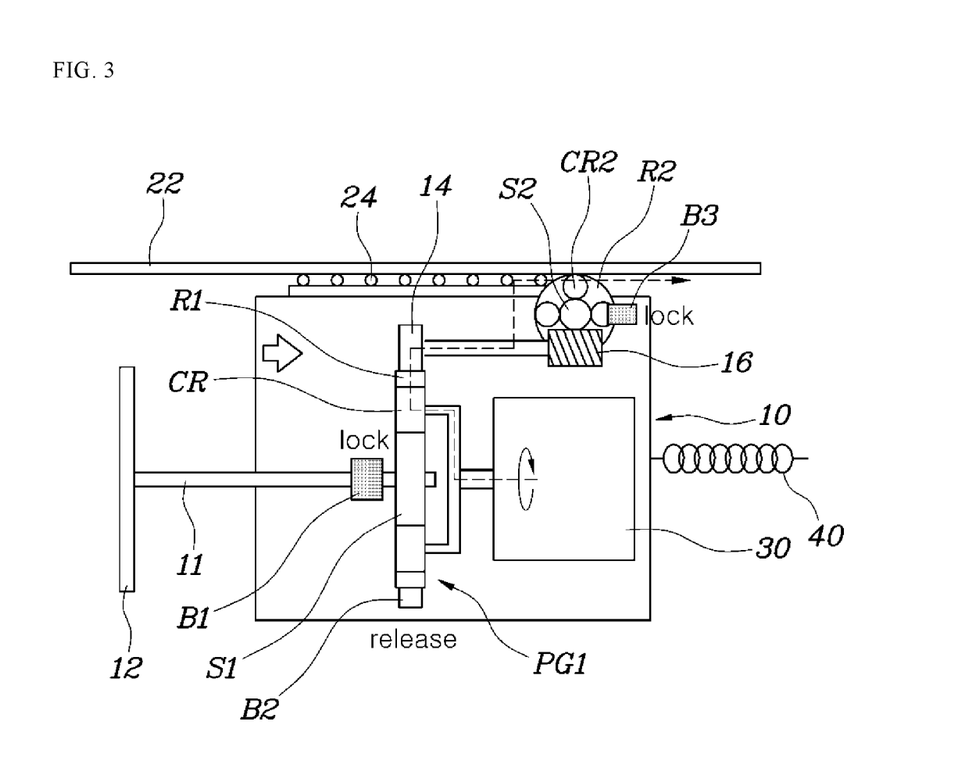
FIG. 3 is a view showing a state in which the steering wheel module 10 is stowed in accordance with an exemplary embodiment of the present disclosure.

Meanwhile, FIG. 2 is a view showing an actuation force path for operation of stowing the steering wheel module 10 in accordance with the present disclosure. FIG. 3 is a view showing a state in which the steering wheel module 10 is stowed in accordance with the present disclosure. Referring to the drawings, a controller 100 may be configured to lock the first braking element B1 while releasing locking of the second braking element B2 and locking the third braking element B3. In this state, the controller 100 may be configured to operate the reaction force motor 30, thereby causing the steering wheel module 10 to slide by actuation force of the reaction force motor 30.

In other words, when the first braking element B1 is locked upon stowage of the steering wheel 12, the first sun gear S1 may operate as a locking element. In this state, rotation in one direction applied to the first carrier CR1 through the reaction force motor 30 is may be to the first ring gear R1 and the second sun gear S2 via the first carrier CR1.

Additionally, the second carrier CR2 may operate as a locking element by the third braking element B3 and therefore, rotational force transmitted to the second sun gear S2 is transmitted to the second ring gear R2. As a result, the second ring gear R2 may be configured to rotate in one direction while engaged with the rack gear 22. Accordingly, it may be possible to axially slide the steering wheel module 10 in an axial direction of the steering wheel 12 toward the stowage space 20.

For reference, as the steering wheel module 10 moves to the interior of the stowage space 20, the return spring 40 may be compressed and, as such, resilience force thereof may be increased. Thus, when the stowage operation of the steering wheel 12 is requested, operations of the telescopic motor 50 and the first to third braking elements B1 to B3 as well as the reaction force motor 30 may be operated by the controller 100 and, as such, stowage operation of the steering wheel 12 may be achieved.

Particularly, the controller 100 may include a motor controller 110 and a braking controller 120. The reaction force motor 30 and the telescopic motor 50 may be operated by the motor controller 110, whereas the first to third braking elements B1 to B3 may be operated by the braking controller 120. In other words, in an exemplary embodiment of the present disclosure, the controller 100 may be embodied through a non-volatile memory (not shown) configured to store data as to an algorithm configured to execute operation of various constituent elements of the vehicle or software commands to reproduce the algorithm, and a processor (not shown) configured to execute operations to be described hereinafter, using the data stored in the memory. The memory and the processor may be embodied as individual chips, respectively. Alternatively, the memory and the processor may be embodied as a single integrated chip. The processor may have a structure including one or more processors.

Figure 4:
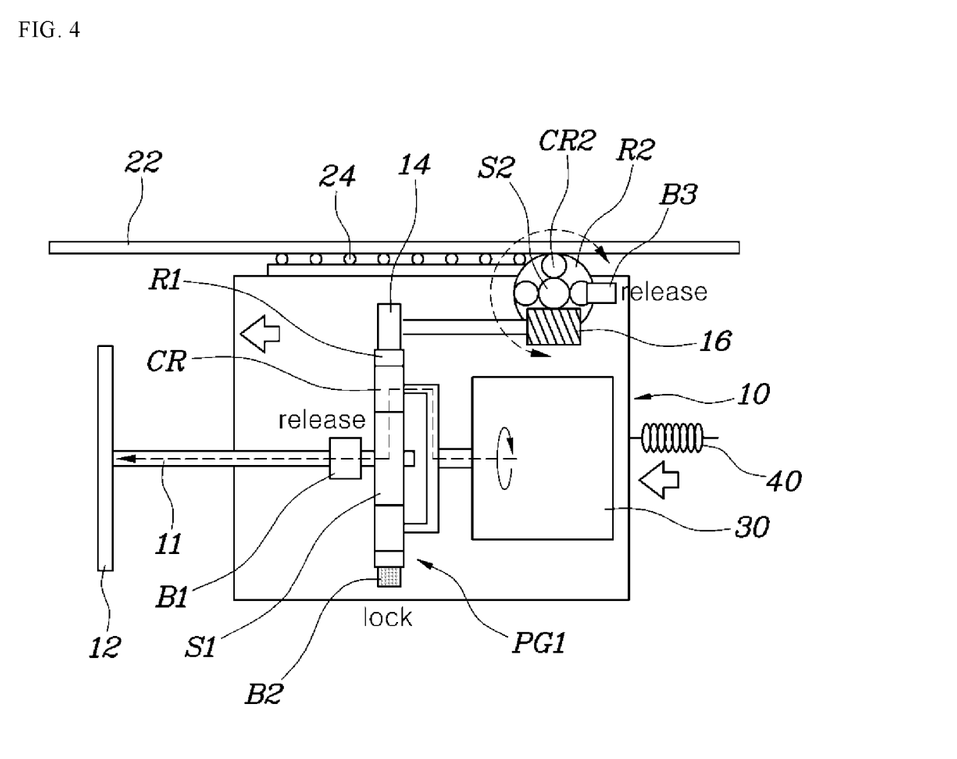
FIG. 4 is a view showing an actuation force path for deployment operation of the steering wheel module and an actuation force path for synchronization of the steering wheel according to an exemplary embodiment of the present disclosure.

Meanwhile, FIG. 4 shows an actuation force path for deployment operation of the steering wheel module 10 according to the present disclosure. Referring to FIG. 4, when a deployment mode for the steering wheel 12 is requested, the controller 100 may be configured to operate the third braking element B3 to release locking thereof, thereby causing the fourth rotational element to be in a freely rotatable state. In this state, accordingly, the steering wheel module 10 may be slidably deployed by resilience force of the return spring 40.

In other words, when locking of the third braking element B3 is released upon deployment of the steering wheel 12, the second carrier CR2 may rotate freely. As a result, the second ring gear R2 may be unable to be maintained in a locked state with respect to the rack gear 22 and, therefore, unable to lock the steering wheel module 10. Since the return spring 40 may be maintained in a compressed state in this case, the steering wheel module 10 may slide in an axial direction of the steering wheel 12 away from the storage space 20 as resilience force of the return spring 40 is applied to the steering wheel module 10.

Meanwhile, in FIG. 4, an actuation force path for synchronization of the steering wheel 12 is shown. Referring to FIG. 4, upon deployment of the steering wheel 12, the controller 100 may be configured to operate the reaction force motor 30 in a state of releasing locking of the first braking element B1 while locking the second braking element B2 and the third braking element B3, to synchronize a steering angle of the steering wheel 12 with a tire steering angle.

For example, when the operation mode of the steering wheel 12 is changed to the driver steering mode during autonomous driving of the vehicle, it is necessary to perform a task for synchronizing the steering angle of the steering wheel 12 with the tire steering angle. The task for synchronizing the steering angle of the steering wheel 12 with the tire steering angle be performed before the driver grasps the steering wheel 12. In other words, when the second braking element B2 is locked upon deployment of the steering wheel 12, the first ring gear R1 may operate as a locking element. Then, rotational force applied to the first carrier CR1 through the reaction force motor 30 may be transmitted to the first sun gear S1 via the first carrier CR1 and the steering angle of the steering wheel 12 connected to the first sun gear S1 may be adjusted.

Accordingly, the steering angle of the steering wheel 12 becomes equal to the tire steering angle before the operation mode of the steering wheel 12 is returned to a driver steering mode. Thus, steering manipulation of the driver may be performed safely at a time when the operation mode of the steering wheel 12 is returned to the driver steering mode in accordance with shift of driving control management.

Figure 5:
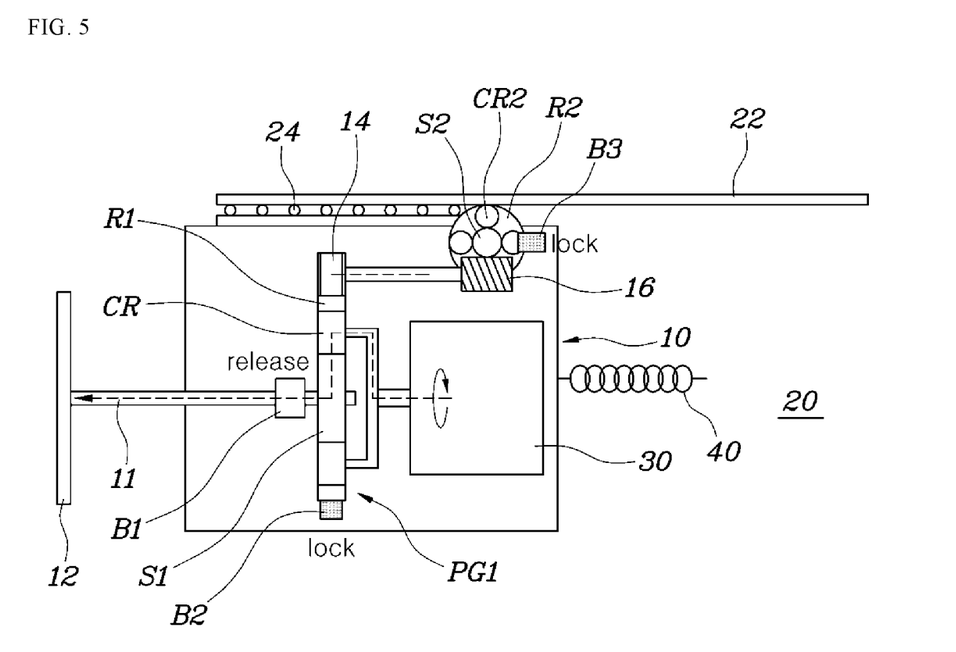
FIG. 5 is a view showing an actuation force path for application of steering reaction force to the steering wheel in a driver steering mode according to an exemplary embodiment of the present disclosure.

Meanwhile, FIG. 5 is a view showing an actuation force path for application of steering reaction force to the steering wheel 12 in the driver steering mode according to the present disclosure.

Referring to FIG. 5, in the driver steering mode, the controller 100 may be configured to operate the reaction force motor 30 in a state of releasing locking of the first braking element B1 while locking the second braking element B2 and the third braking element B3, to apply reaction force to the steering wheel 12. In other words, the second braking element B2 is in a locked state in the driver steering mode and, as such, the first ring gear R1 may operate as a locking element. As a result, rotational force applied to the first carrier CR1 through the reaction force motor 30 may be transmitted to the first sun gear S1 via the first carrier CR1. Accordingly, steering reaction force may be applied to the steering wheel 12 connected to the first sun gear S1.

Meanwhile, in a method for controlling the device for stowing the steering wheel 12 in accordance with the present disclosure, it may be possible to operate, by the controller 100, the reaction force motor 30 in a state in which locking of the second braking element B2 is released, and the first braking element B1 and the third braking element B3 may be locked in response to receiving a request for the stowage mode for the steering wheel 12, thereby causing the steering wheel module 10 to slide by actuation force of the reaction force motor 30.

In addition, when the deployment mode for the steering wheel 12 is requested, locking of the third braking element B3 is released, thereby causing the fourth rotational element to be freely rotatable. In this state, the steering wheel module 10 may slide to be deployed by resilience force of the return spring 40. In addition, the reaction force motor 30 may be operated in the deployment mode of the steering wheel 12 in a state in which locking of the first braking element B1 is released, and the second braking element B2 and the third braking element B3 may be locked, to synchronize the steering angle of the steering wheel 12 with the tire steering angle.

In the driver steering mode, it may be possible to operate, by the controller 100, the reaction force motor 30 in the state in which locking of the first braking element B1 is released, and the second braking element B2 and the third braking element B3 are locked, to apply reaction force to the steering wheel 12.

Figure 7:
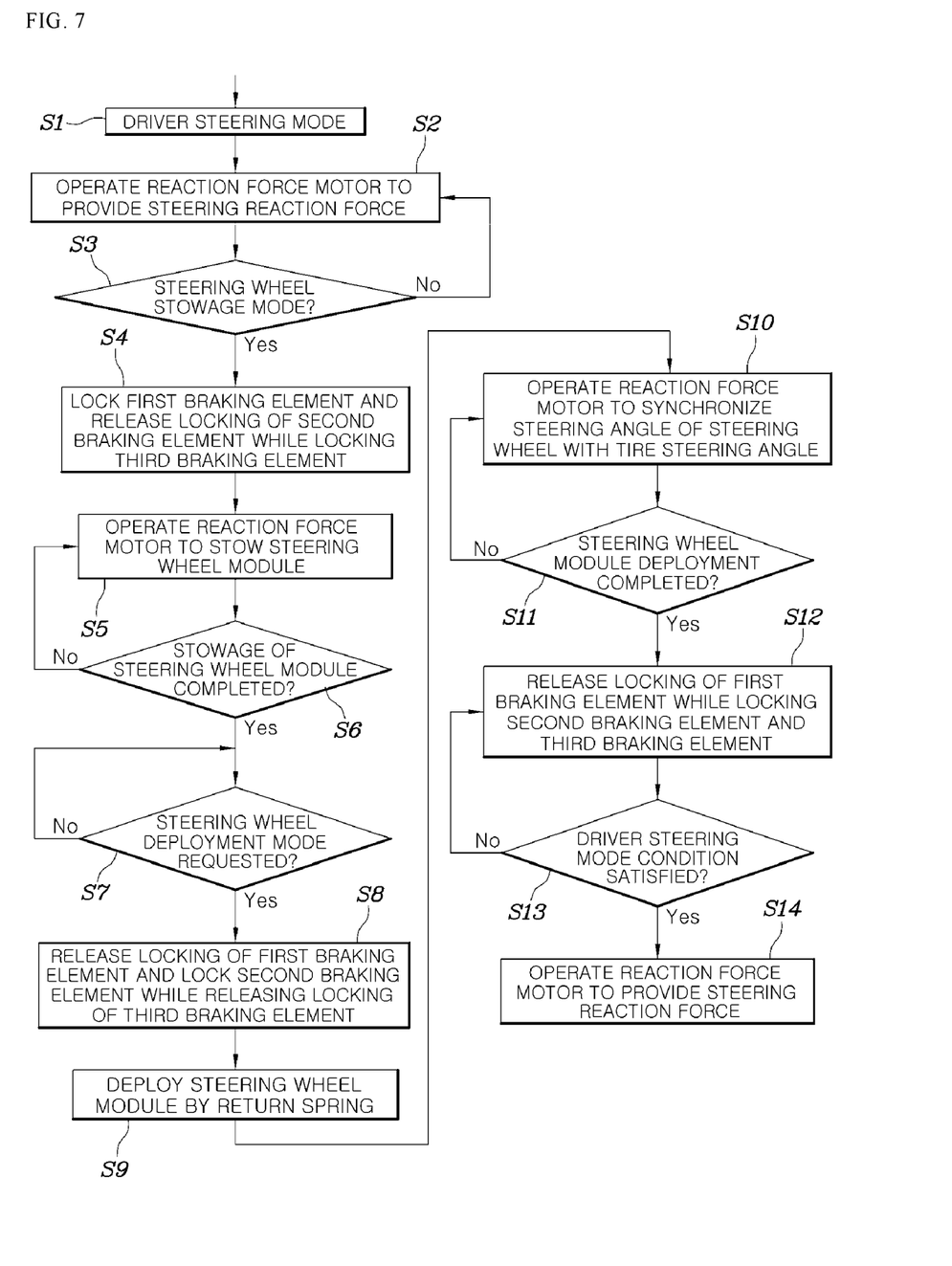
FIG. 7 is a flowchart showing stowage and deployment control procedures using the steering wheel stowage device according to an exemplary embodiment of the present disclosure.

Meanwhile, FIG. 7 is a flowchart showing stowage and deployment control procedures using the device for stowing the steering wheel 12 in accordance with the present disclosure. Hereinafter, procedures of stowing and deploying the steering wheel 12 will be described with reference to FIG. 7. First, when the driver drives the vehicle in the driver steering mode (S1), the second braking element B2 may be locked, thereby causing the first ring rear R1 to be locked, as shown in FIG. 5. In addition, locking of the first braking element B1 may be released, thereby causing the first sun gear S1 to be in a locking-released state.

Accordingly, rotational force supplied from the reaction force motor 30 may be transmitted to the steering column 11 via the first carrier CR1 and the first sun gear S1 and therefore, steering reaction force against a steering input from the driver may be applied to the steering wheel 12 (S2). In this state, the third braking element B3 may be locked, thereby locking the second carrier CR2. The first sun gear S1 may also be locked since the first sun gear S1 is engaged with the worm gear 16, and the second ring gear R2 may be locked by the second braking element B2. In other words, rotation of the first sun gear S1 and the second carrier CR2 may be restricted and, as such, rotation of the second planetary gear set PG2 may be restricted. As a result, movement of the steering wheel module 10 may be restricted.

In such a driving situation, whether there is a request for shift to the steering wheel stowage mode may be determined (S3). In response to determining, based on results of determination in S3, that there is a request for shift to the steering wheel stowage mode, the first braking element B1 may be locked, thereby causing the first sun gear S1 to be locked, and locking of the second braking element B2 may be released (S4).

As a result, rotational force supplied from the reaction force motor 30 may be transmitted to the idle gear 14 via the first carrier CR1 and the first ring gear R1, thereby causing the idle gear 14 to rotate together with the worm gear 16. In accordance with rotation of the worm gear 16, the second sun gear S2 may be configured to rotate. In this state, the second carrier CR2 may be locked by the third braking element B3 and, therefore, rotational force transmitted to the second sun gear S2 may be transmitted to the second ring gear R2. Accordingly, the second ring gear R2 may be configured to rotate in one direction while the second ring gear R2 is engaged with the rack gear 22, thereby sliding the steering wheel module 10 toward the stowage space 20 (S5).

In addition, as shown in FIG. 6, the telescopic motor 50 may be configured to operate to move the steering wheel 12 in a direction toward the stowage space 20 and, as such, stowage operation of the steering wheel 12 may be performed. Thereafter, whether the steering wheel module 10 is completely stowed at a target position in the stowage space 20 may be determined (S6). This determination may be achieved through position control of the reaction force motor 30.

Meanwhile, whether a request is received for shift to the deployment mode for the steering wheel 12 during execution of the stowage mode for the steering wheel 12 may be determined after stowage of the steering wheel module 10 is completed (S7). In response to receiving in S7 a request for shift to the deployment mode for the steering wheel 12, locking of the third braking element B3 may be released, thereby causing the second carrier CR2 to be freely rotatable, as shown in FIG. 4 (S8).

As a result, the second ring gear R2 may be rotatable along the rack gear 22. In other words, the restrained state of the steering wheel module 10 may be released and therefore, the steering wheel module 10 may be deployed through sliding thereof in a direction in which the steering wheel module 10 moves away from the stowage space 20 by resilience force of the compressed return spring 40, to be deployed (S9). In this state, the first braking element B1 may release locking of the first sun gear S1, and the second braking element B2 may be locked, thereby locking the first carrier CR1.

As the reaction force motor 30 operates to transmit rotational force supplied therefrom to the steering wheel 12 via the first carrier CR1 and the first sun gear S1 in the deployment mode for the steering wheel module 10, the steering angle of the steering wheel 12 may be synchronized with the tire steering angle (S10). For reference, in this state, the telescopic motor 50 may be configured to operate to axially move the steering wheel 12 in a direction away from the stowage space 20 and the steering wheel 12 may be deployed to be in a state thereof before stowage, as shown in FIG. 6.

Subsequently, whether the steering wheel module 10 is completely deployed at a target position outside the stowage space 20 may be determined (S11). In response to determining in S11 that deployment of the steering wheel module 10 is completed, locking of the first braking element B1 may be released, and the second braking element B2 may be maintained in a locked state, whereas the third braking element B3 may be locked, thereby causing the second carrier CR2 to be to be locked, as shown in FIG. 5 (S12).

Thereafter, whether a driver steering mode condition is satisfied may be determined (S13). This determination may be achieved through determination as to whether the steering wheel module 10 and the steering wheel 12 are completely deployed, whether the steering wheel 12 is in a hand-on/off state, or the like. When the driver steering mode condition is not satisfied, the controller may be configured to output a notification to the driver. In response to determining in S13 that the driver steering mode condition is satisfied, rotational force supplied from the reaction force motor 30 may be transmitted to the steering column 11 via the first carrier CR1 and the first sun gear 51 and, as such, steering reaction force against a steering input from the driver may be applied to the steering wheel 12 (S14).

As described above, in accordance with the present disclosure, stowage operation of the steering wheel 12 may be performed more rapidly by the reaction force motor 30 which operates at a high torque. In particular, when an emergency deployment operation of the steering wheel 12 is required, the reaction force motor 30 may be configured to deploy the steering wheel 12 together with the steering wheel module 10 at high speed by resilience force of the return spring 40. Accordingly, operation of shifting driving control management to the driver during autonomous driving may be performed more rapidly and safely. In addition, since stowage operation of the steering wheel 12 may be performed by the reaction force motor 30 previously mounted to the steering system, it is unnecessary to additionally install a motor or actuator for stowage operation of the steering wheel 12. Accordingly, in particular, it may be possible to reduce cost and weight while maintaining a space maximization effect realized by the SBW system.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A device for stowing a steering wheel, comprising:
a steering wheel module including a steering wheel, wherein the steering wheel module is movable to an interior of a stowage space together with the steering wheel;
a complex planetary gear set including a first rotational element connected to the steering wheel while being selectively locked by a first braking element, a second rotational element connected to a reaction force motor, a third rotational element selectively locked by a second braking element, a fourth rotational element selectively locked by a third braking element, and a fifth rotational element configured to operate as an output element;
a sliding unit configured to slide the steering wheel module into the stowage space using rotational force output from the fifth rotational element; and
a return spring configured to provide resilience force in a direction in which the steering wheel module moves away from the storage space to be deployed.

2. The device according to claim 1, wherein:
the complex planetary gear set includes a first planetary gear set and a second planetary gear set;
the first rotational element is a first sun gear of the first planetary gear set;
the second rotational element is a first carrier of the first planetary gear set;
the third rotational element includes a first ring gear of the first planetary gear set and a second sun gear of the second planetary gear set;
the fourth rotational element is a second carrier of the second planetary gear set; and
the fifth rotational element is a second ring gear of the second planetary gear set.

3. The device according to claim 2, wherein:
the sliding unit includes a rack gear provided at an inner surface of the stowage space, which is formed in an interior of a vehicle, wherein the rack gear extends in an axial direction of the steering wheel; and
the fifth rotational element is rotatably provided at the steering wheel module to connect the fifth rotational element between the third rotational element and the rack gear in a gear engagement manner, to be movable along the rack gear while rotating.

4. The device according to claim 3, further comprising:
an idle gear engaged with the first ring gear; and
a worm gear provided to be coaxial with the idle gear,
wherein the worm gear is engaged with the second sun gear,
wherein the second sun gear is engaged with the second ring gear via the second carrier, and
wherein the second ring gear is engaged with the rack gear such to engage first ring gear and the rack gear in a gear engagement manner.

5. The device according to claim 2, further comprising:
a controller configured to operate the reaction force motor in a state of locking the first braking element and releasing locking of the second braking element while locking the third braking element, in response to receiving a request for a stowage mode for the steering wheel to cause the steering wheel module to slide by actuation force of the reaction force motor.

6. The device according to claim 2, further comprising:
a controller configured to release locking of the third braking element in response to receiving a request for a deployment mode for the steering wheel to cause the second carrier to be freely rotatable and cause the steering wheel module to slide in a deployment direction by resilience force of the return spring.

7. The device according to claim 6, wherein, in the deployment mode for the steering wheel, the controller is configured to operate the reaction force motor in a state of releasing locking of the first braking element while locking the second braking element and the third braking element, to synchronize a steering angle of the steering wheel with a tire steering angle.

8. The device according to claim 6, wherein, in a driver steering mode, the controller is configured to operate the reaction force motor in a state of releasing locking of the first braking element while locking the second braking element and the third braking element, to apply reaction force to the steering wheel.

9. A method for controlling the steering wheel stowing device according to claim 2, comprising:
operating, by a controller, the reaction force motor in a state of locking the first braking element and releasing locking of the second braking element while locking the third braking element, in response to receiving a request for the stowage mode for the steering wheel to cause the steering wheel module to slide by actuation force of the reaction force motor.

10. The method according to claim 9, wherein, in response to receiving a request for the deployment mode for the steering wheel, locking of the third braking element is released to cause the rotational elements of the second planetary gear set to be freely rotatable and cause the steering wheel module to slide in the deployment direction by resilience force of the return spring.

11. The method according to claim 10, wherein, in the deployment mode for the steering wheel, the reaction force motor is operated in a state in which locking of the first braking element is released, and the second braking element and the third braking element are locked, to synchronize a steering angle of the steering wheel with a tire steering angle.

12. The method according to claim 9, wherein, in a driver steering mode, the reaction force motor is operated in a state of releasing locking of the first braking element while locking the second braking element and the third braking element, to apply reaction force to the steering wheel.

13. The device according to claim 1, wherein the return spring is connected, at a first end thereof, to an end of the steering wheel module while being connected, and at a second end thereof, to a portion of a vehicle body facing the steering wheel module.

* * * * *